E. BAGOT.
Beer Measure.
No. 26,807.
Patented Jan'y 10, 1860.
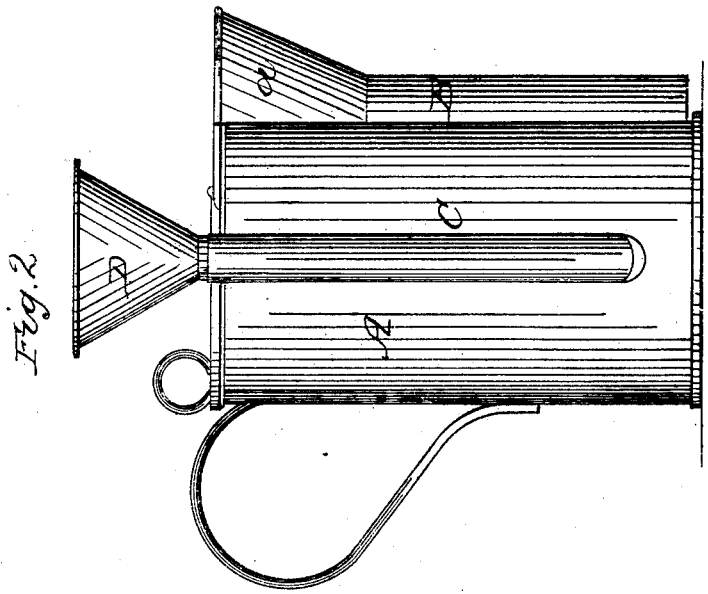
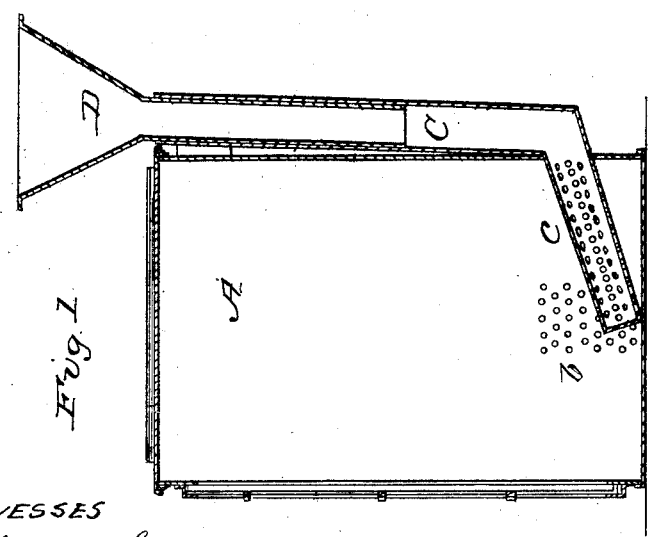
WITNESSES
Mich Hughes
Charles W Hughes
INVENTOR
Edward Bagot

UNITED STATES PATENT OFFICE.

E. BAGOT, OF NEW YORK, N. Y., ASSIGNOR TO G. B. GORDON, OF SAME PLACE.

BEER-MEASURE.

Specification of Letters Patent No. 26,807, dated January 10, 1860.

*To all whom it may concern:*

Be it known that I, EDWARD BAGOT, of the city, county, and State of New York, have invented a new and Improved Beer-Measure; and I do hereby declare that the following is a full, clear, and exact description of the same, reference being had to the annexed drawings, making a part of this specification, in which—

Figure 1, is a sectional elevation of my invention. Fig. 2, an elevation of the same not bisected.

Similar letters of reference indicate corresponding parts in the two figures.

The object of this invention is, to obviate the difficulty attending the frothing of the beer as the latter is drawn from the barrel. This frothing of the beer especially if it be new, causes a great deal of trouble and inconvenience in drawing beer by measurement for retailing, as considerable time elapses before the froth subsides.

This invention consists in admitting the beer into the lower part of the measure, and also pouring the beer from the lower part, by which arrangement the froth is prevented from forming in large quantities, and the froth that does form allowed to rise above the inner end of the discharge spout, so that it may subside without being discharged from the measure.

To enable those skilled in the art, to fully understand and construct my invention, I will proceed to describe it.

A, represents a measure which may be constructed of tinned plate, and in the usual form. To the outer side of the measure a pipe B, is secured. The upper end of this pipe has a nozzle *a*, formed on it, and the lower end of the pipe B, communicates with the lower part of the measure, by means of perforations *b*, as shown in Fig. 1.

To the outer side of the measure, a pipe C, is attached. This pipe may have a funnel D, fitted in its upper end and its lower end passes into the measure near its bottom, and is perforated as shown clearly at *c*, in Fig. 1. The pipe C, extends to the top of the measure A.

In drawing the beer, it is admitted into the measure through the pipe C, and in consequence of thus admitting it, but little froth is formed as the beer does not come in contact with the air as it is admitted into the measure. When the beer is admitted into the top of the measure, as heretofore, the agitation produced by the falling stream in contact with the atmospheric air, causes the formation of considerable froth which does not subside before considerable time has elapsed. In my invention all froth that is formed will of course rise to the surface; but, as the measure is filled at the bottom, the agitation of the beer in direct contact with the external air is greatly avoided, that is to say, the agitation is reduced, and as the beer passes into the small pipe C, the air is somewhat excluded or prevented from acting, upon an appreciable area of beer and the formation of froth is correspondingly diminished. By having the pipe B, communicate with the lower part of the measure, the small amount of froth which rises to the top is avoided, and beer even if new and "lively" (as it is commonly termed) can be drawn and measured at once or without delay, and also be drawn and poured out from the measure at once for drinking.

I am aware that pipes B, have been attached to beer measures in order to avoid the froth, but measures with pipes thus attached have not been generally adopted as the measures are filled in the usual way and the usual amount of froth formed, the pipe B, alone, therefore, is not of much advantage; combined however with the induction pipe C, it is valuable.

I do not claim separately the pipe B, so attached to the measure as to communicate with its lower end, for that has been previously used; but, I do claim as new, and desire to secure by Letters Patent —

The combination of the two pipes B, C, applied to the beer measure, as and for, the purpose set forth.

EDWARD BAGOT.

Witnesses:
MICH. HUGHES,
CHS. M. HUGHES.